United States Patent
Krishnan et al.

(10) Patent No.: US 12,112,271 B2
(45) Date of Patent: Oct. 8, 2024

(54) RESOURCE DATA MODELING, FORECASTING AND SIMULATION

(71) Applicant: ACCENTURE GLOBAL SOLUTIONS LIMITED, Dublin (IE)

(72) Inventors: Mythili Krishnan, Bangalore (IN); Dnyaneshwar Ambhore, Aurangabad (IN); Kunal Bhowmick, Bangalore (IN); Lalitha Sundar, Bangalore (IN); Vinita Nair, Bangalore (IN); Arun Purushothaman, Chennai (IN); Anand Janardhanan, Bangalore (IN); Bhavana Rao, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1113 days.

(21) Appl. No.: 16/936,184

(22) Filed: Jul. 22, 2020

(65) Prior Publication Data
US 2022/0027744 A1     Jan. 27, 2022

(51) Int. Cl.
| G06N 20/00 | (2019.01) |
| G06N 5/02 | (2023.01) |
| G06Q 10/04 | (2023.01) |
| G06Q 10/0631 | (2023.01) |
| G06Q 30/0202 | (2023.01) |

(52) U.S. Cl.
CPC ......... *G06N 5/02* (2013.01); *G06Q 10/06315* (2013.01); *G06N 20/00* (2019.01)

(58) Field of Classification Search
CPC ..... G06N 5/02; G06N 20/00; G06Q 10/06315
See application file for complete search history.

(56) References Cited

U.S. PATENT DOCUMENTS

| 6,044,355 A * | 3/2000 | Crockett ............. H04M 3/5233 705/7.14 |
| 7,251,589 B1 | 7/2007 | Crowe et al. |
| 8,089,939 B1 * | 1/2012 | Mater ................... H04W 36/30 370/332 |
| 10,498,897 B1 * | 12/2019 | Chadha ............... H04M 3/5237 |
| 10,565,516 B2 * | 2/2020 | Chen ...................... G06N 20/00 |
| 11,210,515 B2 * | 12/2021 | Mangal ................ G06V 20/188 |
| 11,403,544 B1 * | 8/2022 | Hermoni ................ G06N 20/00 |
| 11,416,755 B2 * | 8/2022 | Ramnani ............... G10L 15/063 |
| 11,693,867 B2 * | 7/2023 | Cheng ................... G06F 16/221 707/769 |

(Continued)

FOREIGN PATENT DOCUMENTS

CN     110866628 A     3/2020

*Primary Examiner* — Jordany Nunez
(74) *Attorney, Agent, or Firm* — Mannava & Kang, P.C.

(57) ABSTRACT

A resource data modeling, forecasting, and simulation system analyzes data pertaining to the data processing tasks and the resources assigned to the data processing tasks to generate short-term forecasts and long-term forecasts of task volumes. The forecasted task volumes are further optimized based on different factors to determine the resources required to handle the forecasted task volume. Various simulations of hypothetical what-if scenarios are also generated based on the forecasts and the resource requirements. The resource data modeling, forecasting and simulation system is based on multi-algorithmic ensemble models for forecasting, automated model selection and the unique simulation methodology based on multiple parameters.

18 Claims, 13 Drawing Sheets

(56) References Cited

U.S. PATENT DOCUMENTS

| | | | | |
|---|---|---|---|---|
| 11,694,124 | B2* | 7/2023 | Ramalingam | G06N 20/00 706/12 |
| 11,704,539 | B2* | 7/2023 | Amiri | G06N 3/044 706/21 |
| 11,734,624 | B2* | 8/2023 | D'Attilio | G06Q 10/04 705/7.16 |
| 11,743,237 | B2* | 8/2023 | Fiumara | G06Q 30/016 726/26 |
| 11,818,298 | B1* | 11/2023 | Petropoulos | H04M 3/5238 |
| 11,887,167 | B2* | 1/2024 | Rastogi | G06Q 30/0276 |
| 2003/0125996 | A1* | 7/2003 | Bush | G06Q 10/06 705/7.31 |
| 2006/0010101 | A1* | 1/2006 | Suzuki | G06F 11/3409 |
| 2007/0140468 | A1* | 6/2007 | Lebel | H04M 3/5175 379/265.05 |
| 2007/0180085 | A1* | 8/2007 | Barnett | G06Q 10/06 709/224 |
| 2009/0030864 | A1* | 1/2009 | Pednault | G06V 10/7625 706/45 |
| 2012/0065746 | A1* | 3/2012 | Wintrich | F23N 5/00 700/48 |
| 2012/0087486 | A1* | 4/2012 | Guerrero | G06Q 10/06311 703/6 |
| 2013/0268318 | A1* | 10/2013 | Richard | G06Q 50/06 705/7.31 |
| 2014/0229233 | A1* | 8/2014 | Hu | G06Q 30/0202 705/7.31 |
| 2018/0342020 | A1* | 11/2018 | Sen | G06Q 10/06375 |
| 2020/0034745 | A1* | 1/2020 | Nagpal | G06N 5/022 |
| 2020/0184494 | A1* | 6/2020 | Joseph | G06F 18/214 |
| 2020/0320294 | A1* | 10/2020 | Mangal | G06N 3/047 |
| 2020/0394533 | A1* | 12/2020 | Ramalingam | G06F 18/25 |
| 2021/0065017 | A1* | 3/2021 | Ramnani | G06N 5/025 |
| 2021/0182701 | A1* | 6/2021 | Jeyachandran | G06N 20/00 |
| 2021/0218844 | A1* | 7/2021 | Matias | G06Q 10/107 |
| 2021/0303969 | A1* | 9/2021 | Amiri | G06N 3/08 |
| 2021/0357402 | A1* | 11/2021 | Cheng | G06Q 30/0202 |
| 2022/0027837 | A1* | 1/2022 | D'Attilio | H04M 3/5175 |
| 2022/0150221 | A1* | 5/2022 | Fiumara | G06F 18/2415 |
| 2022/0318613 | A1* | 10/2022 | Nambirajan | G06N 3/045 |
| 2023/0297583 | A1* | 9/2023 | Cheng | G06Q 30/0202 707/769 |
| 2023/0410134 | A1* | 12/2023 | Khanafer | G06F 18/214 |

* cited by examiner

| DATE | AHTMEAN | AHTSD | INTERVAL | AHTPC | ARRIVAL | CREATION_DATETIME | ASSIGNED_DATETIME | COMPLETION_DATETIME | FTE | TYPE | AHT | TAT | TICKET_ID |
|---|---|---|---|---|---|---|---|---|---|---|---|---|---|
| 7/14/2014 | 543 | 1 | 1 | 0.867155 | 76.6 | 7/14/2014 0:01 | 7/14/2014 0:01 | 7/14/2014 0:08 | 36 | 6 | 471.0494 | 471.0494 | 1 |
| 7/14/2014 | 543 | 1 | 1 | 0.867155 | 76.6 | 7/14/2014 0:02 | 7/14/2014 0:02 | 7/14/2014 0:10 | 37 | 6 | 470.3873 | 470.3873 | 2 |
| 7/14/2014 | 543 | 1 | 1 | 0.867155 | 76.6 | 7/14/2014 0:03 | 7/14/2014 0:03 | 7/14/2014 0:11 | 38 | 6 | 470.8568 | 470.8568 | 3 |
| 7/14/2014 | 543 | 1 | 1 | 0.867155 | 76.6 | 7/14/2014 0:05 | 7/14/2014 0:05 | 7/14/2014 0:13 | 39 | 6 | 471.341 | 471.341 | 4 |
| 7/14/2014 | 543 | 1 | 1 | 0.867155 | 76.6 | 7/14/2014 0:06 | 7/14/2014 0:06 | 7/14/2014 0:14 | 40 | 6 | 473.4771 | 473.4771 | 5 |
| 7/14/2014 | 543 | 1 | 1 | 0.867155 | 76.6 | 7/14/2014 0:08 | 7/14/2014 0:08 | 7/14/2014 0:15 | 41 | 6 | 472.5879 | 472.5879 | 6 |
| 7/14/2014 | 543 | 1 | 1 | 0.867155 | 76.6 | 7/14/2014 0:09 | 7/14/2014 0:09 | 7/14/2014 0:17 | 42 | 6 | 470.0832 | 470.0832 | 7 |
| 7/14/2014 | 543 | 1 | 1 | 0.867155 | 76.6 | 7/14/2014 0:10 | 7/14/2014 0:10 | 7/14/2014 0:18 | 43 | 6 | 471.6763 | 471.6763 | 8 |
| 7/14/2014 | 543 | 1 | 1 | 0.867155 | 76.6 | 7/14/2014 0:11 | 7/14/2014 0:11 | 7/14/2014 0:19 | 44 | 6 | 469.1352 | 469.1352 | 9 |
| 7/14/2014 | 543 | 1 | 1 | 0.867155 | 76.6 | 7/14/2014 0:12 | 7/14/2014 0:12 | 7/14/2014 0:20 | 45 | 6 | 470.0157 | 470.0157 | 10 |
| 7/14/2014 | 543 | 1 | 1 | 0.867155 | 76.6 | 7/14/2014 0:13 | 7/14/2014 0:13 | 7/14/2014 0:21 | 46 | 6 | 471.2277 | 471.2277 | 11 |
| 7/14/2014 | 543 | 1 | 1 | 0.867155 | 76.6 | 7/14/2014 0:14 | 7/14/2014 0:14 | 7/14/2014 0:22 | 47 | 6 | 468.5834 | 468.5834 | 12 |
| 7/14/2014 | 543 | 1 | 1 | 0.867155 | 76.6 | 7/14/2014 0:15 | 7/14/2014 0:15 | 7/14/2014 0:23 | 48 | 6 | 471.5106 | 471.5106 | 13 |
| 7/14/2014 | 543 | 1 | 1 | 0.867155 | 76.6 | 7/14/2014 0:16 | 7/14/2014 0:16 | 7/14/2014 0:24 | 49 | 6 | 471.6911 | 471.6911 | 14 |
| 7/14/2014 | 543 | 1 | 1 | 0.867155 | 76.6 | 7/14/2014 0:17 | 7/14/2014 0:17 | 7/14/2014 0:25 | 50 | 6 | 470.0891 | 470.0891 | 15 |
| 7/14/2014 | 543 | 1 | 1 | 0.867155 | 76.6 | 7/14/2014 0:19 | 7/14/2014 0:19 | 7/14/2014 0:26 | 51 | 6 | 469.7978 | 469.7978 | 16 |
| 7/14/2014 | 543 | 1 | 1 | 0.867155 | 76.6 | 7/14/2014 0:20 | 7/14/2014 0:20 | 7/14/2014 0:28 | 52 | 6 | 470.8685 | 470.8685 | 17 |
| 7/14/2014 | 543 | 1 | 1 | 0.867155 | 76.6 | 7/14/2014 0:21 | 7/14/2014 0:21 | 7/14/2014 0:29 | 53 | 6 | 471.4252 | 471.4252 | 18 |

RESOURCE DATA MODELING, FORECASTING AND SIMULATION

BACKGROUND

Data modeling is the act of exploring data-oriented structures. Like other modeling artifacts, data models can be used for a variety of purposes, from high-level conceptual models to physical data models. One of the methodologies to create data models can include statistical data modeling which is a process of applying statistical analysis to a data set. A statistical model is a mathematical representation or a mathematical model of observed data. As artificial intelligence (AI) gains prominence in different domains, statistical modeling is being increasingly used for making predictions about the future based on the observed data.

BRIEF DESCRIPTION OF DRAWINGS

Features of the present disclosure are illustrated by way of examples shown in the following figures. In the following figures, like numerals indicate like elements, in which:

FIG. 10 shows a table that illustrates assigning simulated tasks to available agents in accordance with the examples disclosed herein.

DETAILED DESCRIPTION

Figure 1:
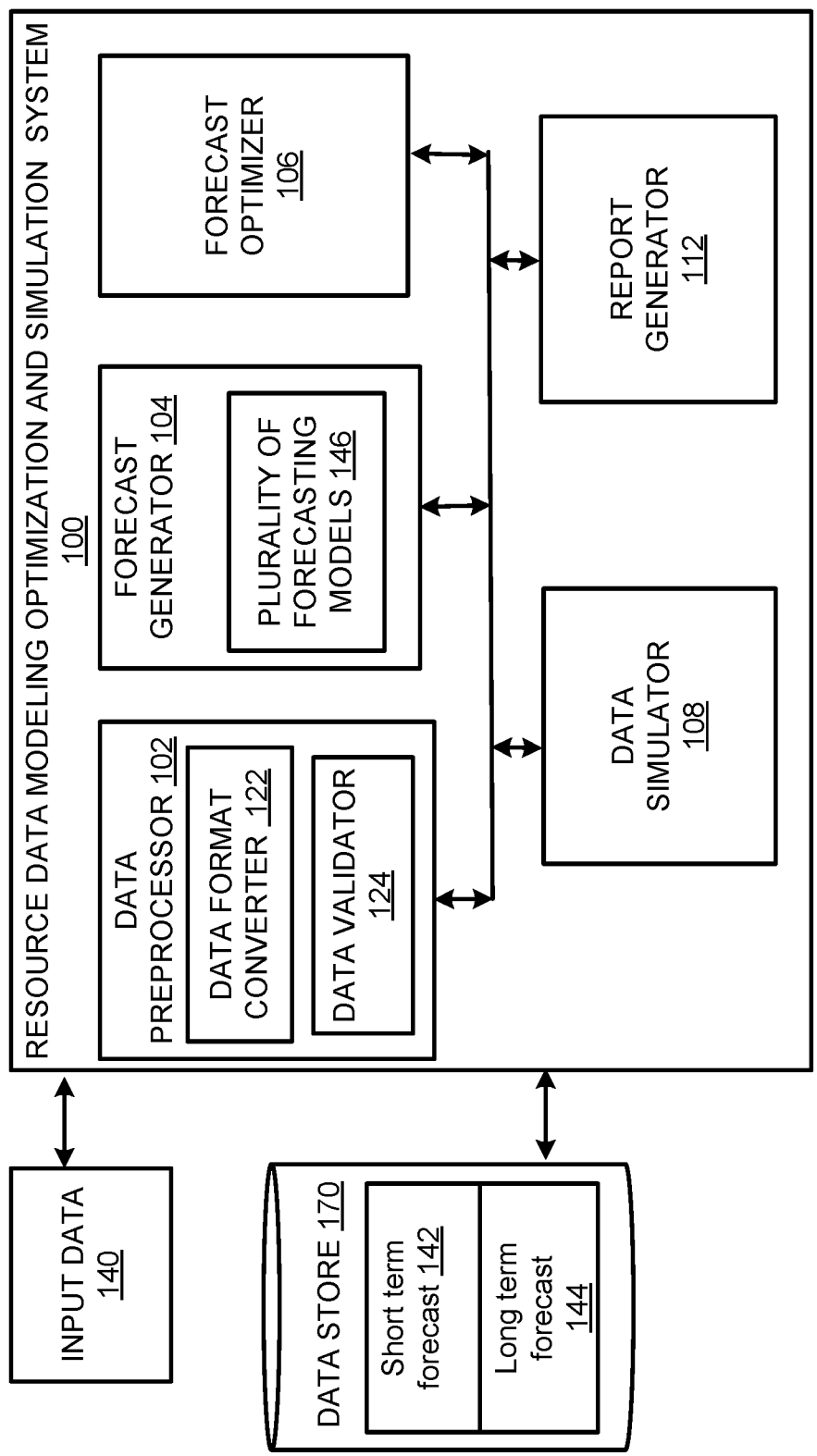
FIG. 1 shows a block diagram of a resource data modeling, optimization, and simulation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A resource data modeling and simulation system is disclosed. The forecasting and simulation system receives input data regarding the data processing tasks to be executed and the resources that can be assigned to execute the data processing tasks. In an example, the resources can be human employees who execute the data processing tasks. Also, the data processing tasks can include tasks that can be handled within a predetermined time range by the resources. In an example, the data processing tasks can include repetitive or non-repetitive tasks that are confined to a single channel or which are executed over multiple channels. The forecasts can pertain to a task volume or the number of data processing tasks that can be expected to be received in a specified time period. The forecasting and simulation system can be configured to generate short-term forecasts to predict the task volume that can be expected in shorter time periods such as a day. The forecasting and simulation system can also be configured to generate long-term forecasts to predict the task volume that can be expected in longer time periods such as one or more weeks or one or more months with data aggregated at weekly levels. The forecasted task volumes are further optimized to obtain the resource requirements or the number of resources needed to handle the task volume expected within the specified time period. Additionally, forecasts and optimized values can be used to generate simulations for various operational parameters.

The input data regarding the data processing tasks and the resources may be received from multiple sources in different formats. The input data is initially processed for outlier and missing value detection and treated via different data imputation techniques. The input data thus processed can be provided within a predetermined format to the forecasting and simulation system for the forecast generation. When an input is received for generating the forecasts, the input can be analyzed to determine if one or more of a short-term forecast or a long-term forecast is to be generated. If the short-term forecast is to be generated, then the input data is aggregated over the shorter time period to generate short-term aggregated data. If any additional input data regarding one or more of the data processing tasks and the resources is received since the short-term aggregated data was generated, then the short-term aggregated data is updated with the additional input data to generate the updated short-term aggregated data.

The short-term forecasts are generated by a plurality of forecasting models that can be trained on the input data to generate the forecasts. More particularly, the input data can be split into training data and the test data. The training data is used to train each of the plurality of forecasting models while the test data is used to test the trained forecasting models. The accuracies of the trained forecasting models are compared and the trained forecasting model with the highest accuracy can be automatically selected and stored as the short-term forecasting model which is used to analyze the updated short-term aggregated data to generate the short-term forecast. Before training and testing the plurality of forecasting models, it can be initially determined, upon receiving the input requesting the forecasts, if a prior short-term forecasting model that was previously used to generate prior short-term forecasts exists. If the prior short-term forecasting model exists (i.e., is stored in the forecasting and simulation system) then the updated short-term aggregated data is provided to the prior short-term forecasting model and the accuracy of the resulting short-term forecast is compared with a predetermined accuracy threshold. If the accuracy of the prior short-term forecasting model falls outside the predetermined accuracy threshold, then a new short-term forecasting model can be selected. In an example, the mean absolute percentage error (MAPE) can be used to determine the accuracy of the forecasting models for making the model selections.

The long-term forecast can also be similarly generated wherein the receipt of new time series data is received, updated long-term aggregated data can be generated and a selected long-term forecasting model can be used to generate long-term forecasts. The forecasts thus generated provide the task volumes for different time periods. However, the task volumes are further optimized and the resource requirements or the number of resources required to execute the tasks are computed. The short-term forecast values can be initially obtained for daily or even hourly intervals. If obtained at a daily level, then the data proportions for the hourly or half-hourly intervals can be obtained. The short-term forecast volumes are split using the data proportions. Calculation of the hourly/half-hourly proportions captures the variations in the volumes of the data processing tasks that can arrive at different hours during a 24 hour period. Various operational parameters are applied to obtain the resource requirements or the resource count which is the number of people handling the data processing tasks. The operational parameters can include but are not limited to, average handling time (AHT) for each of the tasks, information regarding the shifts during which the resources are engaged in handling the data processing tasks, the shrinkages such as non-productive time periods within the shifts e.g., break times or training sessions when the resources are not engaged in handling the data processing tasks, etc. In an example, with known task volume, the AHT of each task, the number of people required to handle the tasks to meet certain service level agreement (SLA) regarding the rate of handling tasks, can be determined via simple mathematical operations. The resource requirements thus obtained are further optimized via generation of a decision matrix which is further processed via simplex method of linear programming. In an example, additional factors such as model error factor or external shrinkages can also be applied to further optimize the resource count.

The forecasting and simulation system further enables generating simulations that provide views of how the procedure of executing the data processing tasks by the resources can change based on the changes in the various factors that affect the procedure. In an example, the tickets or requests for various data processing tasks are simulated or programmatically created based on patterns of task arrivals as detected from the real-world data. The resource availability for the simulated tickets is determined based on information from a resource availability table and the tickets are assigned to the available resources based on the information. On assigning the tickets to available resources, the operational parameters such as the AHTs, Turnaround Time (TAT) are collected for each of the simulated tickets to calculate other process metrics such as the percentage of tasks completed for different hours of the day, resource utilization, etc. The generation of tickets, the assignment of the tickets, and the recordation of the operational parameters are repeated for different levels of the resources, i.e., different teams that may or may not have a different number of resources engaged at different hours in executing the tasks associated with the simulated tickets. In response to simulation user input, what-if scenarios can be generated by varying one or more of a number of the resources handling the data processing tasks and different operational parameters.

In different examples the inputs for generating the forecasts can be received manually per user requirements or automatically. For example, the forecasts may be generated periodically via providing automatic inputs. Additionally, whenever new data is ingested or there is an underlying change in the date due to the change in the volumes or other factors, the inputs for generating one or more of the short-term or long-term forecasts may be automatically provided so that the modelling workflow is invoked wherein the previous model are checked to determine their fit for the data. The model needs to be revised in case it does not fit the newly received data. The workflow then keeps running in loops till the parameters/conditions defined as explained above are satisfied and the best fit model is identified. Once the maxima is reached i.e. the best fit model is identified the algorithm workflow and the loop stops executing and the new model is replaced with the old model.

The resource data modeling and simulation system disclosed herein provides a technical solution to a technical problem of modeling resource data to obtain accurate forecasts. The resource data modeling and simulation system establishes an automatic iterative process with built-in algorithms for model selection procedures so that whenever new data is encountered this process is triggered and best model is selected by the process without any manual intervention. Furthermore, in place of relying on empirical knowledge of human employees regarding the procedures for handling the various data processing tasks, the resource data modeling and simulation system enables exploiting the historical data collected over years of operations to provide a data-embedded approach to receiving, assigning and completing the data processing tasks. Besides generating forecasts for task volumes at different granularities such as at the daily level or the monthly level, the resource data modeling and simulation system also provides for optimizing the forecasts with various factors such as shrinkages or external regressors. Furthermore, the simulations generated by the forecasting and simulation system enable users to realize additional gains by making it possible to visualize what-if scenarios based on real-world data.

FIG. 1 shows a block diagram of the resource data modeling, forecasting, and simulation system 100 in accordance with the examples disclosed herein. The forecasting and simulation system 100 accesses input data 140 regarding the resources to be employed for executing different data processing tasks, generates forecasts for the task volume or the number of data processing tasks that can be expected during a future time period which enable calculating the number of resources required for executing the forecasted task volume. In an example, the resources include human employees or agents that carry out data processing tasks such as handling customer queries, telemarketing, content validation, and editing, etc. The data processing tasks can pertain to data of different formats which is handled over one or more different channels. For example, the data processing tasks can involve textual data wherein the resources would process email, text files, etc., audio data wherein the resources would process phone calls, voice messages, transcription tasks, etc., or even image/video formats wherein the resources would process image files or videos. Hence, the forecasting and simulation system 100 can be configured for multi-channel forecasting.

In an example, the input data 140 can include historical univariate time series data related to the requests/tickets for the data processing tasks to be executed by the resources, the data processing tasks that were completed, etc., from a period for about 6 months. In an example, The time series data can include volume/number of task for a day (daily data) number of task per hour or number of task per half an hour. The time series data can also include the start time of a task, the end time of the task, the total time taken to complete the task, the total number of tasks completed within a given time, etc. The input data 140 can further include other operational parameters such as the AHT, the SLA/TAT, the shift schedules, the shift constraints, the productive shift hours with shrinkage values, the schedules or processing the task queues, the regressors that can have an impact on volumes of data processing tasks that can be executed, holidays, etc. Different data sources such as secure file transfer protocol (SFTP), set up or via SharePoint, etc., provide raw data in different data formats. For example, the information regarding the shifts may be received from a shift information source file in plain text format while the shift constraints may be received from a calendar program in the corresponding formats. Moreover, the historical time series data in the input data can have errors such as missing values, outliers, etc.

The forecasting and simulation system 100 includes a data preprocessor 102, a forecast generator 104, a forecast optimizer 106, a data simulator 108, and a report generator 112. The forecasting and simulation system 100 can be communicatively coupled to a data store 170 for storing data created and/or used during the forecast generation. The data preprocessor 102 enables processing the data to remove errors and transform the data from the various formats into a standardized format(s) required by the forecasting and simulation system 100 to generate the forecasts. The raw data can be processed by a data format converter 122 into a standardized input model template for the input data 140. In an example, the raw data can be consolidated into a workbook format with each tab of the workbook representing a type of data. Graphs for each of the exploratory data analysis measures can also be generated in the output file. The output file can be produced as a hypertext markup language (HTML) file, a portable document file (PDF), etc. The various data analyses measures can include but are not limited to:

a) Summary measures in time series data
b) Time of the day volume analysis
c) Day of the week volume analysis
d) Working day following or before a holiday/weekend-volume analysis
e) Level shift volume analysis (depending on data period)
f) Trend of time series
g) Decomposition of time series The input data 140 can be further processed by a data validator 124 that checks for breaks and for outliers in the historic time series data. The data validator 124 can implement multiple data imputation techniques to compensate for the missing values and for the breaks in the time series data. In an example, the point of view generated is Kalman filter which provides better imputation than other imputation methods. Data imputation using Kalman filter can be coded into the forecasting code. The input data 140 thus processed can be converted from the standard template (i.e., the .html file or the .pdf file) into the required format for the individual modules so that all the modules can be run in one click.

The input data 140 thus processed by the data preprocessor 102 is provided to the forecast generator 104 for obtaining models that are further employed to obtain forecasts and calculations regarding the resources needed to handle the data processing tasks. The forecast generator 104 processes the input data 140 to produce different types of forecasts—a short-term forecast 142 and a long-term forecast 144. Based on the historical resource and task data and the current operational parameters, the short-term forecast 142 can predict the expected number of the data processing tasks for a shorter time period, e.g., a day, an hour, or even a half-hour and the forecast horizon can be around 15 days. Similarly, the long-term forecast 144 can predict the expected number of the data processing tasks for a longer time period e.g., a week, a fortnight or a month and the forecast horizon can pertain to the next 4 points i.e., the forecast is generated for a time period that is about 4 weeks/fortnights/months away. The forecast generator 104 can include a plurality of forecasting models 146, one of which can be selected for producing the forecasts. In an example, the plurality of forecasting models can include but are not limited to, Auto Regressive Integrated Moving Average (ARIMA) model, TBATS model, and Holt-Winters. Model, etc. TBATS is an acronym denoting salient features of the TBATS model which include T for Trigonometric regressors, B for Box-Cox transformations, A for Auto Regressive Moving Average (ARMA) errors, T for Trend and S for Seasonality. It may be noted that when one of the plurality of forecasting models 146 is selected and used for analyzing the input data 140 for making one of the short-term forecast 142 or the long-term forecast 144, then the model can be stored as an existing model. As newer data is received, the input data 140 is updated to include the newer data. The existing model may be tested with the newer data and if the forecasts (one or more of the short-term forecast 142 or the long-term forecast 144) are provided with sufficient accuracy as compared with a predetermined accuracy threshold, the existing model can be used. If, however, the existing model does not provide forecasts with sufficient accuracy, then one of the other models from the plurality of forecasting models 146 can be tested and the new short-term forecasting model can be used for generating the forecasts. The cycle of testing and selecting the newer model if needed, to generate the forecasts, can be repeated as newer data is received at the forecasting and simulation system 100. The forecasts thus produced can be further optimized by the forecast optimizer 106 for specific time periods e.g., hourly or half-hourly periods, or daily, etc. by extracting the proportions which are further optimized based on the operational parameters at the queue level so that the resource requirements can be computed within a narrow interval window.

The optimized forecasts can be further used to create simulations by the data simulator 108 which enables visualizing the resource utilization and if-else scenarios wherein different operational parameters are varied to see the impact on other parameters. The data simulator 108 provides a view of the process with the current resource level in terms of the service level agreement (SLA) which is referred to determine the turnaround time (TAT) as the SLA defines the level of service expected or the target task completion rate. The simulations can be generated based on inputs including but not limited to interval volumes which pertains to the project task volumes and the AHT for a specified time period, the actual daily volumes for a preceding predetermined time period (e.g., 7 days), and resource availability schedules including weekly offs, shift data, etc. The report generator 112 provides for generating reports related to schedule generation, task backlogs, overtimes, etc.

Figure 2:
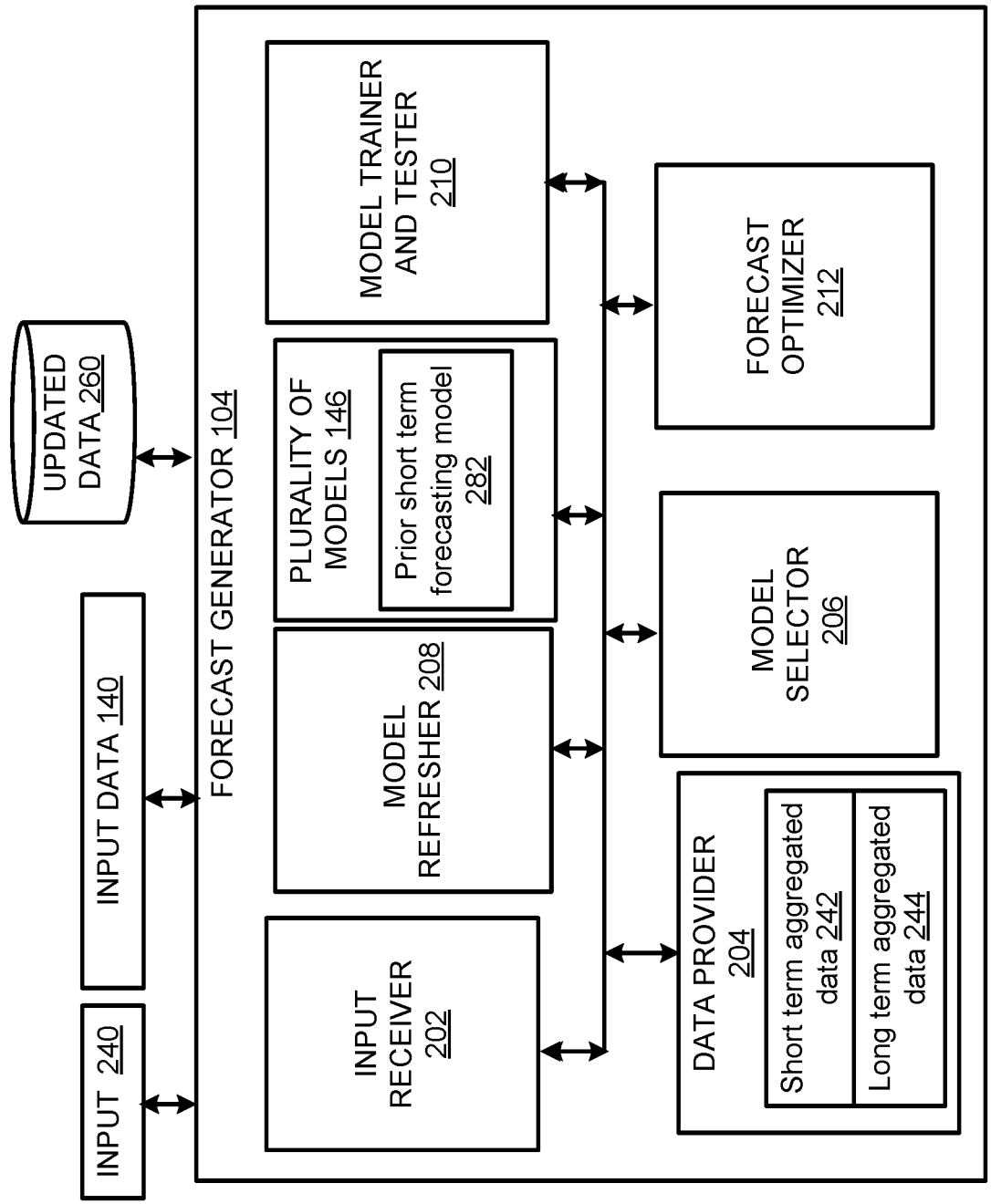
FIG. 2 shows a block diagram of a forecast generator in accordance with the examples disclosed herein.

FIG. 2 shows a block diagram of the forecast generator 104 in accordance with the examples disclosed herein. The forecast generator 104 includes an input receiver 202, a data provider 204, a model selector 206, a model refresher 208, a model trainer, and test 210 and a forecast optimizer 212. The input receiver 202 can receive an input 240 regarding a type of forecast to be generated i.e., whether one or more of a short-term forecast 142 and a long-term forecast 144 is to be generated. In an example, the input 240 provided can include an explicit instruction or keyword which triggers the generation of the forecasts. In an example, the input 240 to trigger the forecasts can be provided automatically. For example, the forecasting and simulation system 100 can be programmed to automatically provide such inputs in order to generate periodic reports and/or simulations with the task volume forecasts that are generated and the resource requirements computed as disclosed herein. The input 240 includes an indication regarding whether one or more of the short-term forecast 142 or a long-term forecast 144 needs to be generated. In addition to the type of forecast, the input 240 can also specify a time period for the forecast. For example, a short-term forecast can be generated for daily or even hourly forecasts whereas a long-term forecast would be generated for fortnightly, monthly, or quarterly forecasts. Besides the input 240, the forecast generator 104 also receives updated data 260. The updated data 260 includes additional resource and task data generated during a time interval that elapsed since the input data 140 was last generated.

Based on the type of forecast to be generated, the data provider 204 aggregates the input data 140 into short-term aggregated data 242 and long-term aggregated data 244 by aggregating the input data 140 and the updated data 260 over a time period specified in the input 240. For example, if the input 240 requests a daily forecast, then the short-term aggregated data 242 including the input data 140 and the updated data 260 collected over a few weeks and aggregated for each day is supplied by the data provider 204. Similarly, if the input 240 requests a fortnightly forecast, then the data provider 204 provides the long-term aggregated data 244 which includes the input data 140 and the updated data 260 collected over a few months and aggregated fortnightly.

The aggregated data thus generated is accessed by the model selector 206 to identify one of the plurality of forecasting models 146 for the generation of the forecast. The plurality of forecasting models 146 can be based on up to twenty-five different algorithms that are run on a given data set to identify the best model for the forecast generation. In an example, a prior short-term forecasting model 282 may have been previously used to model the resource data in prior forecasting cycles. When the input 240 is received and one or more of the short-term aggregated data 242 and the long-term aggregated data 244 is generated, the corresponding model(s) from the prior short-term forecasting model 282 can be initially used to generate the forecast. The accuracy of the forecast generated by the prior short-term forecasting model 282 is determined. If the accuracy of the forecast is within a predetermined accuracy threshold, then the prior short-term forecasting model 282 can be continued to be used for the generation of the forecasts. If the accuracy of the forecast is not within the predetermined accuracy threshold, then the prior short-term forecasting model 282 is not used and instead newer models, i.e., models based on algorithms other than the algorithm used for the prior short-term forecasting model 282 can be used.

When the newer models are to be used, for example, to produce the short-term forecast 142, the model refresher 208 in conjunction with the model trainer and testing 210, provides the short-term aggregated data 242 to each of the plurality of forecasting models 146. More particularly, the model trainer and tester 210 splits the short-term aggregated data 242 into training data and testing data to train and test each of the plurality of forecasting models 146 other than the model which corresponds to the prior short-term forecasting model 282 which has been discarded. For example, 80% can form the training data and 20% form the testing data. The accuracy of the short-term forecast output by each of the plurality of trained models is tested and compared. The model with the highest accuracy is selected by the model refresher 208 to replace the prior short-term forecasting model 282. However, when generating the long-term forecast 144, each of the plurality of forecasting models 146 is trained and tested and the model with the highest accuracy is used to generate the forecast. The testing of the prior models and the selection of the newer model for the short-term forecasts can be repeated each time new data is ingested into the forecasting and simulation system 100 or if there is an underlying change in the data due to changes in volumes or other factors.

Figure 3:
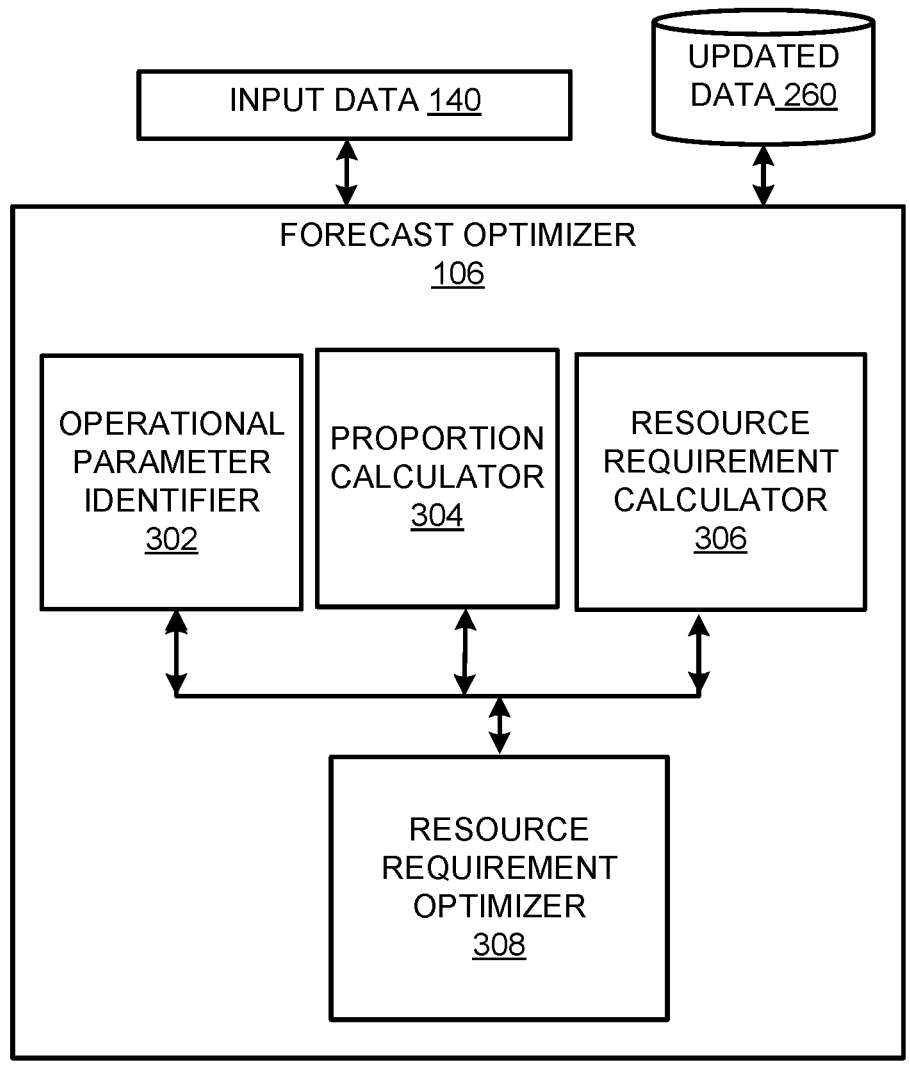
FIG. 3 shows a block diagram of a forecast optimizer in accordance with the examples disclosed herein.

FIG. 3 shows a block diagram of the forecast optimizer 106 in accordance with the examples disclosed herein. The forecast optimizer 106 includes an operations parameter identifier 302, a proportion calculator 304, a resource requirement calculator 306, and a resource requirement optimizer 308. The short-term forecast 142 and the long-term forecast 144 can be further optimized to provide resource requirements at a finer granularity. For example, a daily short-term forecast can be optimized to determine resource requirements at hourly levels. The operations parameter identifier 302 obtains the operational parameters of the data processing task execution from one or more of the input data 140 and the updated data 260. For example, the input data 140 can include resource and task execution data pertaining to the preceding two months. The proportion calculator 304 obtains the proportion of the resources required at hourly levels by splitting the daily task volume forecast at hourly levels based on task volume received at each hour and the AHT of each task. The resource requirement calculator 306 further modifies the output from the proportion calculator 304 to obtain the task volume for a given time interval. The output from the proportion calculator 304 can be further modified based on operational parameters such as shift schedules of the resources, the number of shifts, the shrinkages associated with the shifts so that the productive hours within the shifts are obtained, etc. The resource requirement calculator 306 can generate a decision matrix which can include data pertaining to the shifts and the resources required for each hour of the shifts can be obtained by executing linear programming with simplex method for each of the given shifts in a day in order to obtain the hourly resource requirements. The resource requirement optimizer 308 further optimizes the resource requirement calculations provided by the resource requirement calculator 306 by adding the shrinkage factor and if applicable, the model error factor.

For the long-term forecasts, the resource requirements can be calculated using a direct formula by taking operational parameters into consideration. Optimizations applied per shift or hourly optimizations as described above need not be applied to long-term forecasts as such forecasts pertain to multiple weeks. The formulae for the long-term resource requirement forecast is shown below:

$$\text{Long-term } FTE = \frac{(\text{Long-term forecasted Volume} * \text{Standard } AHT)}{(\text{Seconds for a week} * \text{productive hours})}$$

$$\text{Long-term } FTE = \frac{(\text{Long-term forecasted Volume} * \text{Standard } AHT)}{(\text{Minutes for a week} * \text{productive hours})}$$

Figure 4:
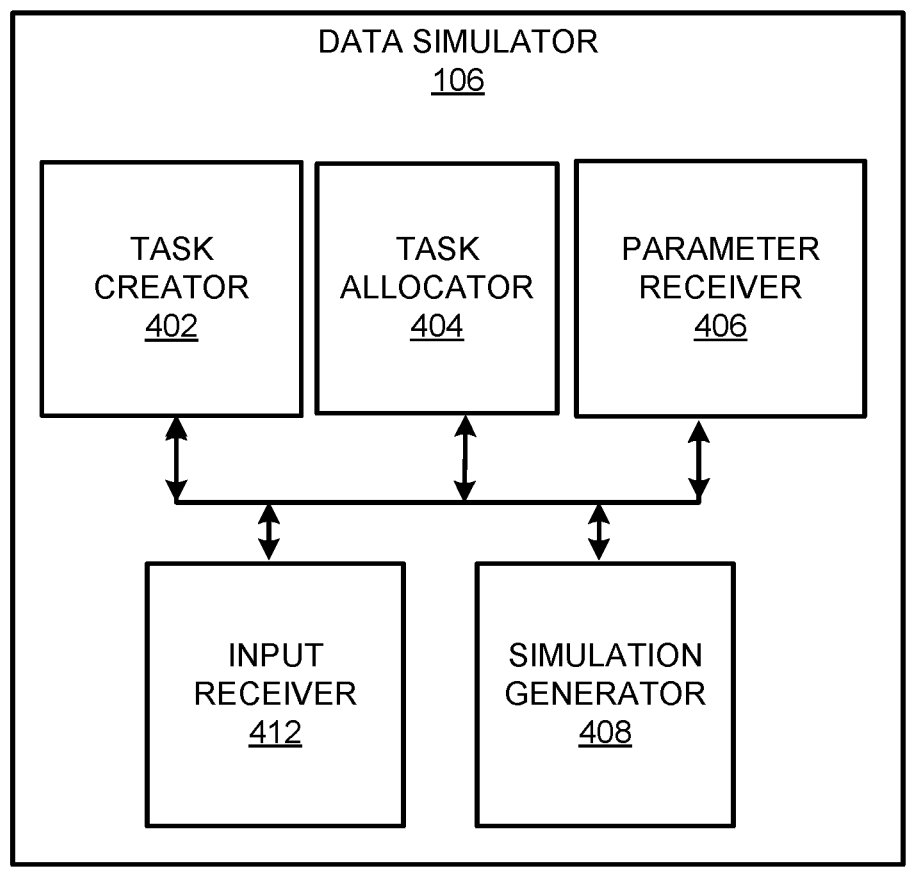
FIG. 4 shows a block diagram of a data simulator in accordance with the examples disclosed herein.

FIG. 4 shows a block diagram of the data simulator 108 in accordance with the examples disclosed herein. The data simulator 108 includes an input receiver 412, a task creator 402, a task allocator 404, a parameter receiver 406 and a simulation generator 408. Based on the forecasts generated by the forecast generator 104, the data simulator 108 provides users options to view current resource requirements in terms of different parameters that may be obtained from the SLA and TAT relationship. The input receiver 412 can, therefore, receive user parameters to generate what-if scenarios based on the current long-term and/or short-term forecasts. For example, the data simulator 108 can use the forecasts to enable determining the task completion rate when the number of resources is changed. The data simulator 108 receives inputs required to generate the simulations which can include but are not limited to, interval volumes which pertain to the proportion of the volumes and the AHT for the data period specified by the user as one of the user parameters, the actual daily volumes and the resource schedules with the weekly off and shifts that span 24 hours are also flagged. The task creator 402 creates hypothetical tickets or requests for tasks randomly distributed across different intervals of the day for the time period under consideration thereby replicating the real-world task processing. In an example, functions from programming tools such as 'R' may be used for the task or ticket creation. Ticket creation can include creating a date/time stamp for each task. In addition, the resource availability, the shift start time, the shift end time, and the resources available at the particular time are also retrieved. The tasks thus created are assigned by the task allocator 404 to the resources per the resource availability as obtained from a resource availability table which may be accessed from an external scheduling tool by the forecasting and simulation system 100. In an example, the tasks can be assigned to the resources in a serial order or other predetermined patterns.

Upon assignment of the tasks to the resources, the AHT, the TAT for each simulated task are obtained for computations of process metrics such as percentage of tasks completed for different hours of the day, resource utilization, etc. Based on such calculations the number of resources needed to complete the simulated tasks can be estimated. The parameter receiver 406 may receive user-supplied parameters which can vary one or more of the number of resources available, any changes in schedules, the TAT, etc. Based on the user-supplied parameters and the generated forecasts, the other process metrics are calculated and the scenarios are simulated by the simulation generator. In an example, the simulations generated may include graphs or other infographics that convey the information regarding the task completion and resource requirements in accordance with the operational parameters and other user-supplied parameters.

Figure 5A:
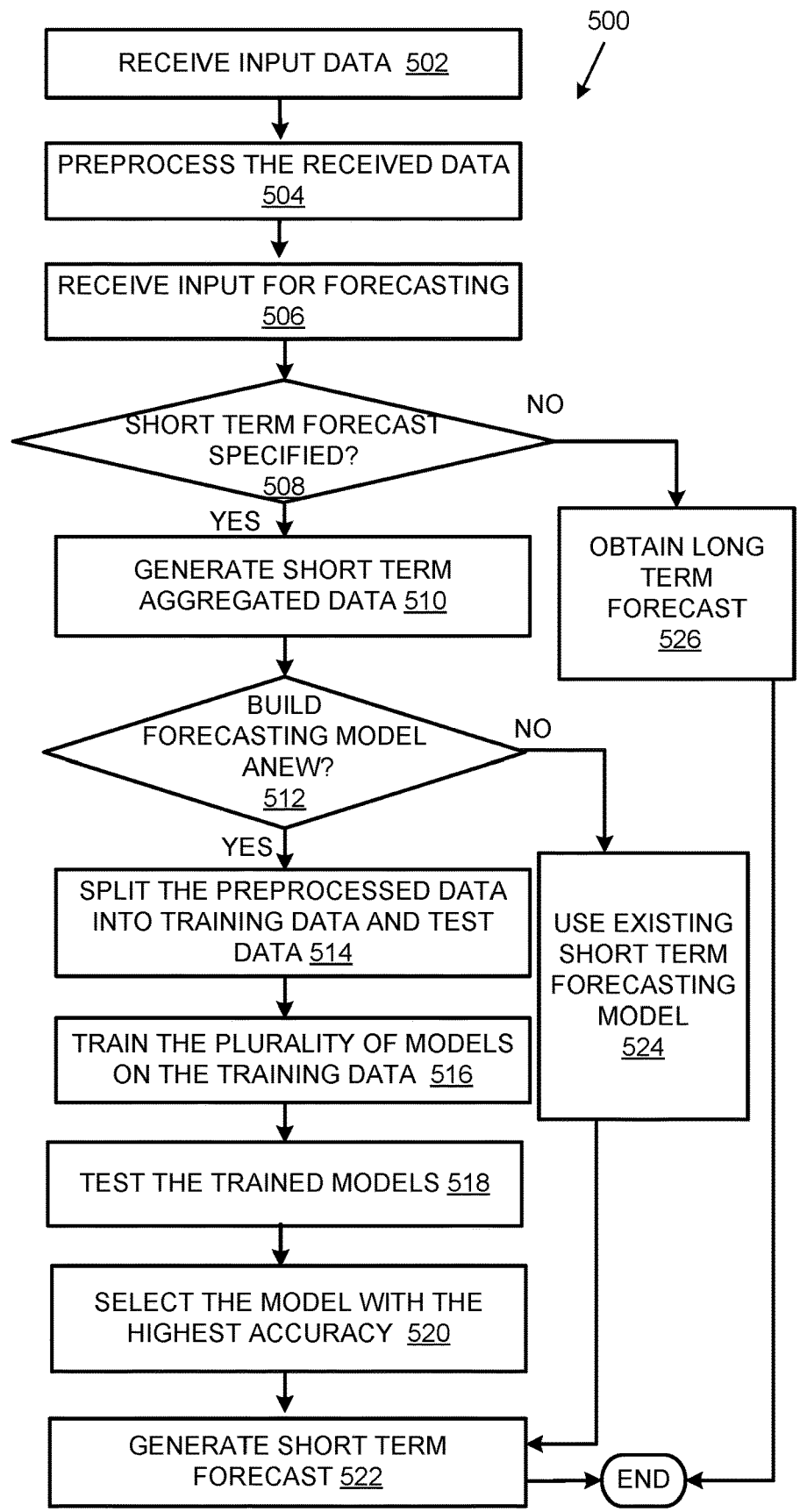
FIG. 5A shows a flowchart that details a method of modeling and simulating resource data in accordance with examples disclosed herein.

FIG. 5A shows a flowchart 500 that details a method of modeling and resource data and generating forecasts in accordance with examples disclosed herein. The method begins at 502 with the forecasting and simulation system 100 receiving the input data 140 including the historical time series data regarding the resources for handling data processing tasks. Also, other operational parameters such as AHT, TAT, shift information such as the number of shifts, the shift constraints, the daily task volume data, the hourly task volume data, etc. are also received at 502. At 504, the received data including the input data 140 is preprocessed for data quality checks. The input data 140 and the other operations parameter data received at 502 can be consolidated into a workbook format with each tab of the workbook representing a type of data. The different types of data may include but are not limited to, task volumes pertaining to the univariable time series data of the tasks/tickets for a historical period of not less than 6 months. The task volumes can include the total number of tasks received and the total number of tasks processed. Another type of data can include historical operational parameters data including the AHTs, the utilization, the shift durations, the productive shift hours with shrinkage values, etc. The shift schedule along with the roster information forms another type of data. The information regarding the regressors that can have an impact on the task volumes is also collected along with the holiday calendar when the resources are unavailable for task processing. The data in the standardized input model template, e.g., consolidated into the workbook format is further processed, for example, for the generation of graphs for the different exploratory data analysis measures in an output file as detailed herein. In an example, the output file can be generated as a HTML file or a PDF file. Furthermore, techniques such as Kalman filter are used for data imputation.

At 506, the input 240 regarding a type of forecast to be generated is received. The input 240 can specify whether one or more of a short-term forecast 142 and a long-term forecast 144 is to be generated. It is determined at 508 if the received input specifies a short-term forecast. It may be appreciated that although the generation of a short-term forecast or a long-term forecast is presented herein as an either-or option, the short-term forecast and the long-term forecast can also be generated serially or in parallel by aggregating the same data differently as detailed herein. If it is determined at 508 that the input does not specify short-term forecast then the method branches to 526 to obtain long-term forecasts and the method terminates on the end block.

If it is determined at 508 that the short-term forecast 142 is to be generated, the data preprocessed at 504 is aggregated at 510 into short-term aggregated data based on the forecast time interval. For example, if the input 240 requests a daily forecast, then the data can be aggregated daily. In an example, the forecast horizon can be about 15-16 days. It is further determined at 512 if the forecasting model is to be build anew. The forecasting model may need to be built anew if there is no prior short-term forecasting model that was previously used to generate forecasts or if the prior short-term forecasting model produces inaccurate results for the input data 140. If the MAPE of the prior short-term forecasting model is greater than a predetermined percentage, e.g., 20% or the MAPE is greater than a predetermined point variation, e.g., 10 points from the previous MAPE then it is determined that the forecasting model needs to be refreshed or built anew.

If it is determined at 512 that the forecasting model is to be built anew, the preprocessed data is split at 514 into training data and test data. The plurality of forecasting models 146 which can be modeled as short-term forecasting models to generate short-term forecasts or as long-term forecasting models to generate long-term forecasts are accessed and trained at 516 on the training data. The trained models are tested at 518 by applying the test data and one of the plurality of trained models with the highest accuracy is selected at 520 as the short-term forecast model to generate the short-term forecasts at 522 for any data that may be received. The selected short-term forecast model along with the short-term forecasts are stored by the forecast and simulation system 100. If it is determined at 512 that a new short-term forecasting model need not be built anew, then it is concluded at 524 that the prior short-term forecasting model has sufficient accuracy. In an example, if the accuracy of the prior short-term forecasting model has MAPE that varies less than 10 points from previous MAPE, then the prior short-term forecasting model has sufficient accuracy and may continue to be used to generate the short-term forecasts at 522. The stored results of short-term forecasting can be used for shift wise optimization activity.

Figure 5B:
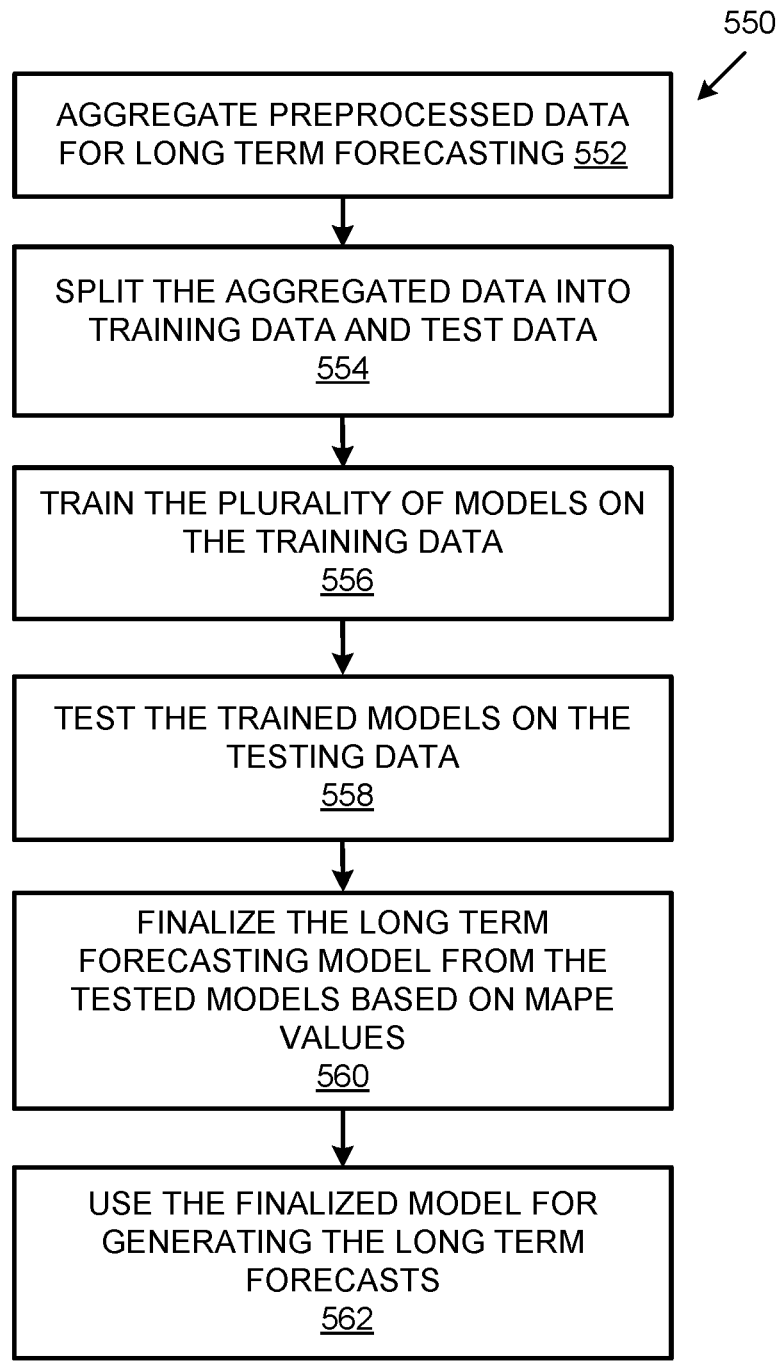
FIG. 5B shows a flowchart that details a method of generating long-term forecasts in accordance with the examples disclosed herein.

FIG. 5B shows a flowchart 550 that details a method of generating long-term forecasts in accordance with the examples disclosed herein. The method begins at 552 wherein the preprocessed data is aggregated for long-term forecasting. For example, the data for long-term forecasts can be aggregated at a weekly level. The aggregated data is split at 554 into training data and the testing data. At 556, the plurality of forecasting models 146 are trained on the training data and tested on the testing data at 558. The long-term forecasting model is finalized from the tested models at 560 based on the MAPE values so that the model with the least MAPE value is finalized and stored at 562 for generating forecasts for future data. In an example, the long-term forecasting models can further be tweaked to consider external regressors that can affect the task volumes. An external regressor library created based on a domain associated with the data processing tasks can be further updated by the forecasting and simulation system 100 based on the macroeconomic factors, the environmental factors, political events, etc. The baseline forecasts can be initially obtained by the long-term forecasting models and the lift/impact of the external regressors (e.g., event, promotion, holiday) can be calculated. Stored results of the long-term forecasting is used for calculating the resource requirement at a weekly level by using the formula which takes into consideration of operational parameters.

Figure 6:
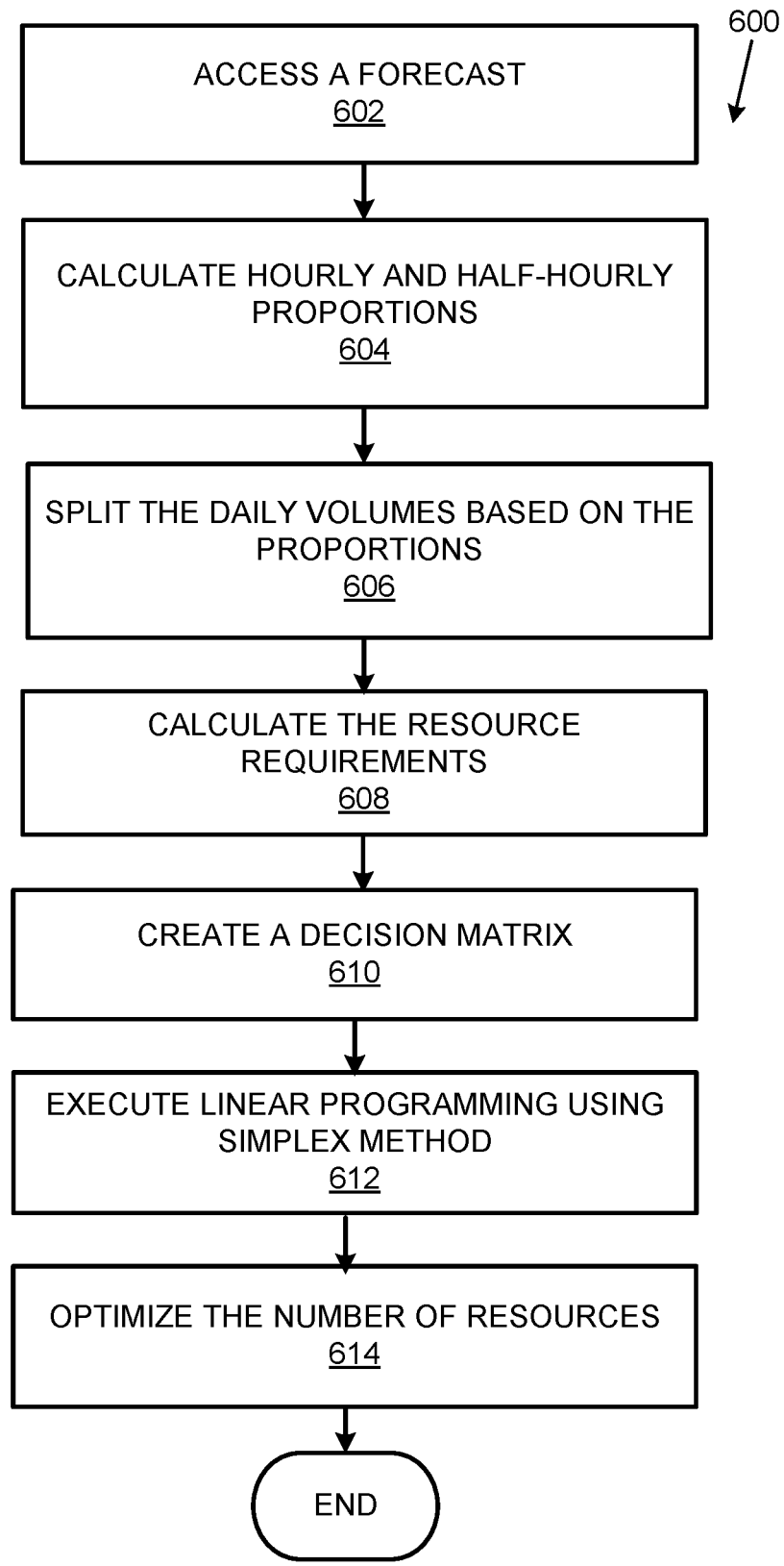
FIG. 6 shows a flowchart that details a method of optimization of the forecasts in accordance with the examples disclosed herein.

FIG. 6 shows a flowchart 600 that details a method of optimization of the forecasts in accordance with the examples disclosed herein. The method begins at 602 wherein a forecast which may include a short-term forecast or the long-term forecast is accessed. In an example, short-term forecasts may be more suitable candidates for optimizations as the short-term forecasts enable identifying resources needed to work in particular shifts or adjust the shifts to optimize for the resources and tasks. At 604, the proportions of tasks are calculated at hourly and half-hourly levels from the short-term forecast. In an example, historical data of the preceding few months can be used to calculate the hourly/half-hourly level proportions. The task volumes thus obtained for each day are split at 606 among the hours based on the proportions. The resource requirements or the number of resources needed to handle the tasks are calculated at 608 using the task volumes along with the operational parameters such as AHT, TAT, shift durations, etc. The information regarding the shifts can be obtained from a source file, for example, and the interval between the shifts can be calculated. Using the shift timings and the future forecast days horizon, a decision matrix is generated at 610. At 612, linear programming using simplex method is executed for all the given shifts in a day based on the constraint matrix. At 614, the number of resources required to handle the tasks at the hourly and half-hourly basis is further optimized based on factors such as but not limited to, external shrinkage, model error factors, etc.

Figure 7:
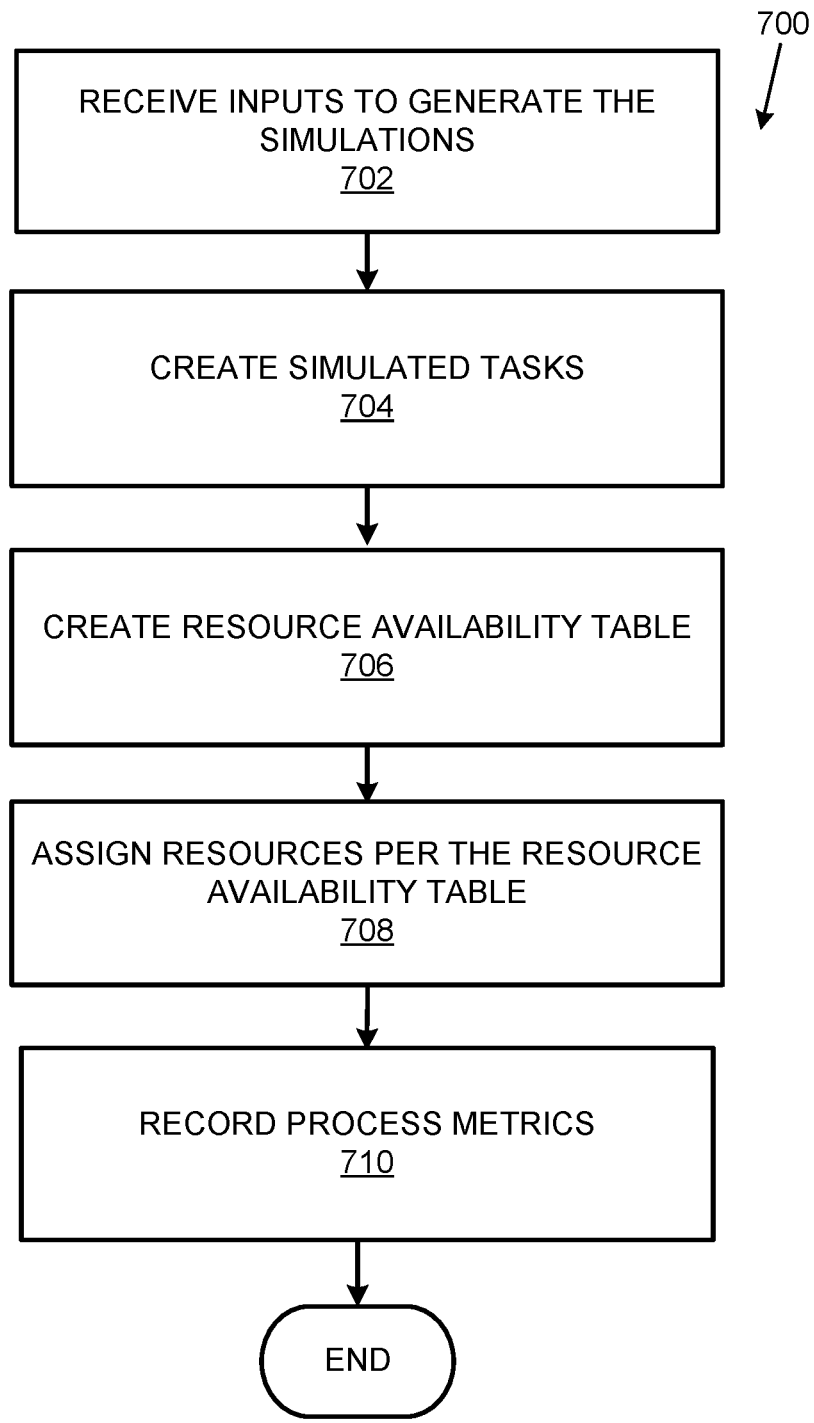
FIG. 7 shows a flowchart that details a method of creating simulations from the forecasts in accordance with the examples disclosed herein.

FIG. 7 shows a flowchart 700 that details a method of creating simulations from the forecasts in accordance with the examples disclosed herein. The various inputs required for simulations such as but not limited to, interval volumes, the actual volumes at the daily level, the resource schedules with weekly offs, shift details such as shift durations, the shift start, and end timings, etc., are received at 702. At 704, simulated tickets or requests for specific tasks are created. The tickets can be simulated using, for example, programming constructs in 'R'. Here, the tickets for the days chosen for the simulation are created depending on the historical arrival patterns indicative of the timing patterns according to which the task requests are received and within a day's volume distribution. The tickets are created for simulation with a timestamp with an hour and second specified. Further, tickets can be created with some randomness infused which may be present in any natural process, but the overall arrival pattern is maintained. Additionally, the AHT variation that may naturally occur among individual agents can also be considered. The historic period roster can be accessed for the agent availability schedule. At 706, the resource availability table is created from the start and end date and timings of the shifts that enable assigning the tasks to the resources that will execute them. The simulated tasks are assigned to the available resources or agents as per the resource availability table at 708. The tickets or tasks are assigned to the agents based on the availability at the point of the generation of the task. For example, if 3 tasks are generated and 2 agents are available at the time of the task generation, there is one task that is aging and cannot be taken up unless one of the agents is free. These imbalances can have an impact on the SLA. At 710, the AHT, the TAT, and other process metrics are recorded for each simulated ticket to obtain other metrics such as percentage of tasks completed for different hours of the day, the resource utilization, etc. Similarly, when the user specifies other parameters such as a different number of resources, then the steps detailed above may be repeated. For example, if the steps 702-710 were initially executed for 42 agents, but the user requires a what-if scenario simulation for the results when the number of agents is increased or decreased by 10%, then the steps 702-710 are repeated for all the different agent numbers.

Figure 8:
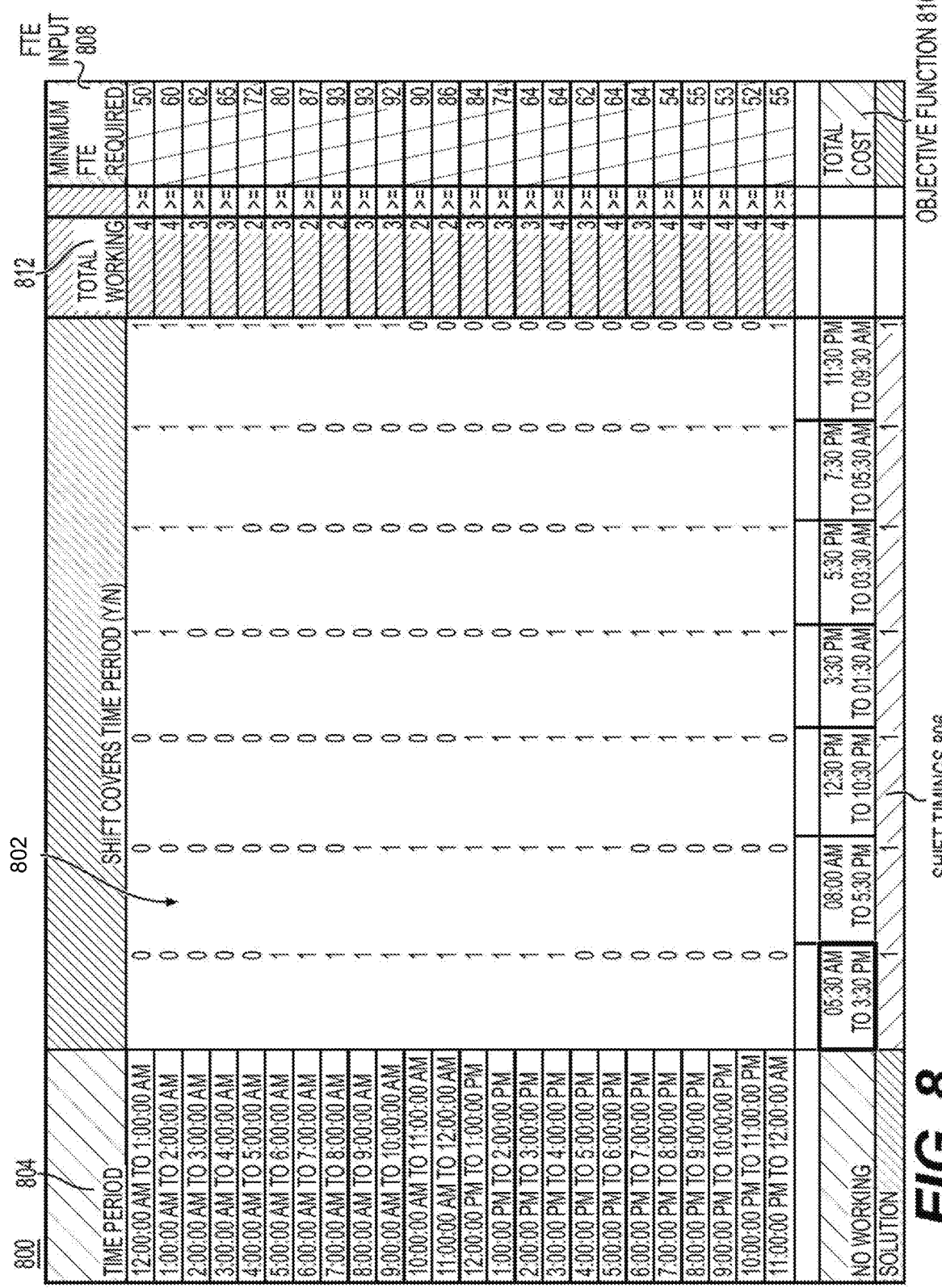
FIG. 8 shows an example of a decision matrix generated in accordance with the examples disclosed herein.

FIG. 8 shows an example of a constraint matrix 800 generated in accordance with the examples disclosed herein. An example use case of forecast, optimization, and simulation is illustrated below with reference to the constraint matrix 800. The forecasts related to task volumes are further optimized as detailed above in order to obtain an accurate estimation of the resource requirements for handling the tasks. The optimization problem involves maximizing or minimizing some function relative to some set, often representing a range of choices available in a certain situation. The function allows comparison of different choices for determining the "best" choice. Different optimization methods such as linear optimization method (including the simplex method), non-linear optimization method, and the evolutionary method can be used. In accordance with the linear method, a linear expression can be either maximized or minimized subject to finitely many linear constraints. Some numerical examples are discussed below for illustration purposes only and it may be appreciated the disclosed subject matter is not limited by the numbers below and that the numbers may vary as needed by different processes.

For an example, consider 7 shifts in a day for a data processing center as follows:

05:30 AM TO 3:30 PM
08:00 AM TO 5:30 PM
12:30 PM TO 10:30 PM
3:30 PM TO 01:30 AM
5:30 PM TO 03:30 AM
7:30 PM TO 05:30 AM
11:30 PM TO 09:30 AM

The table below shows an example distribution of the agents or resources required to handle the tasks for 24 hours:

| Hour of the Day | Agents required |
| --- | --- |
| 1 | 58 |
| 2 | 60 |
| 3 | 62 |
| 4 | 65 |
| 5 | 72 |
| 6 | 80 |
| 7 | 87 |
| 8 | 93 |
| 9 | 93 |
| 10 | 92 |
| 11 | 90 |
| 12 | 86 |
| 13 | 80 |
| 14 | 74 |
| 15 | 68 |
| 16 | 64 |
| 17 | 61 |
| 18 | 60 |
| 19 | 60 |
| 20 | 58 |
| 21 | 55 |
| 22 | 53 |
| 23 | 52 |
| 24 | 55 |

The data above is provided to the forecast optimizer 106 to arrive at the optimal number of agents or resources in each shift so that the desired minimum number of agents is determined for each interval (i.e., each hour). Referring now to the constraint matrix 800, wherein 802 forms the time periods 804 covered by the different shifts 806 based on the shift timings, and the minimum number of agents 808 required to handle the task volume. An objective function 810 is created to optimize (i.e., increase or decrease) the number of agents needed to handle the task volume. The number of decision variables for the creation of the objective function for the optimization depends on the shifts deployed for handling the task volume. In the constraint matrix 800, the objective function to be optimized pertains to the cost coefficient multiplied by the optimal number of agents wherein the cost coefficient is set equal to 1. The constraint matrix 802 is a matrix created with columns equal to the number of shifts for the process in a day and the rows of the matrix equal to the number of hours in a day i.e., 24 hours. The cells of the constraint matrix 802 are filled with 0s and 1s depending on whether the shift is active during a given shift timings 806. The full-time employee (FTE) input 808 or the resource count pertains to the demand for the resources in that particular hour. The FTE input is obtained from the task volume forecast by the forecast generator 104. The task volumes forecast by the forecast generator 104 are converted into the resource counts using the AHT and the productive hour percentages. The total working 812 conveys the number of agents working at the hour specified in the time period 804 column. A total of 24 constraints—one for each hour of the day are applied such that the total number working for a given hour should be greater than or equal to the FTE input 808 for that hour. The forecast optimizer 106 generates the optimal resource count in such a way that the constraints are satisfied while minimizing the objective function.

Figure 9:
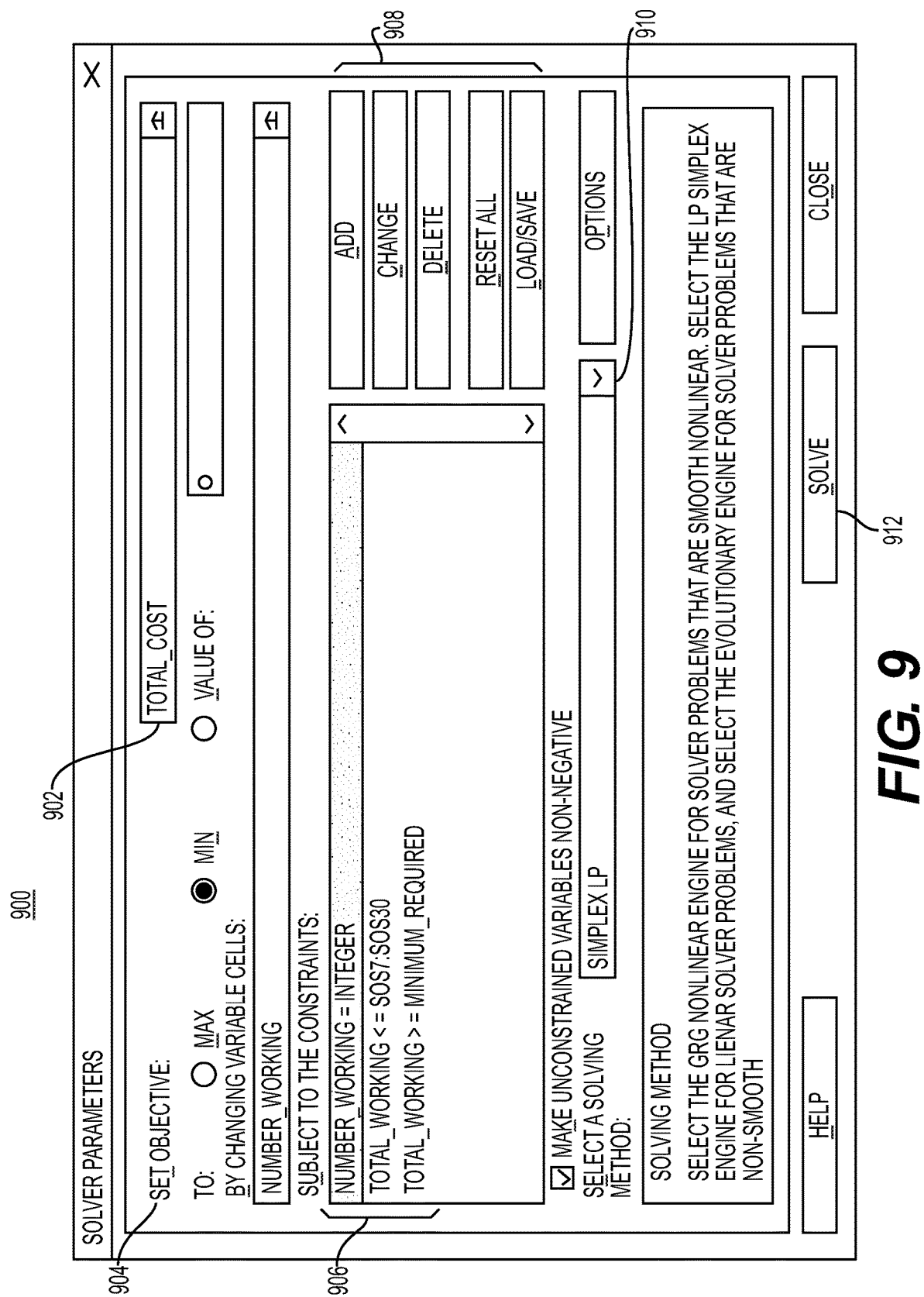
FIG. 9 shows a solver input screen for solving the object function in accordance with the examples disclosed herein.

FIG. 9 shows a solver input screen 900 for solving the objective function with the optimal number of resources for each shift while simultaneously satisfying the constraints of the minimum number of agents required. As discussed above, the objective function is set to total cost 902, with minimization option 904 selected and the objective function is subject to constraints 906 which may be added, changed, or deleted via the buttons 908. The method of solving the objective function is selected via the drop-down box 910 and clicking the solve button 912 enables generating the optimum resource count to handle a given task volume.

FIG. 10 shows a table 1000 that illustrates assigning simulated tasks to available agents and the different parameters for each of the simulated tasks. The data simulator 108 accesses the historic task volume of a process at the hourly level (for about a week or a month depending on the task volume) and creates a similar scenario in 'R' which is a programming tool used for the generation of the simulations. For example, if the daily volumes for a process are as shown in the table below:

| Day | Volume of Task |
| --- | --- |
| Day 1 | 506 |
| Day 2 | 478 |
| Day 3 | 496 |
| Day 4 | 503 |
| Day 5 | 526 |
| Day 6 | 521 |
| Day 7 | 510 |

The total task volume received for a week is 3540. The data from the table above enables calculating hourly incoming task volume patterns. Accordingly, the times of the day when the bulk of the task volume can be typically expected can be derived so that the resources can be made available during such times to handle the task volumes. For example, each task may have some fixed AHT of 150 sec and typically a team of 26 people, for example, coming in 4 different shifts with overlaps between them may be assigned for these processes. The data simulator 108 is configured to replicate such a typical process with the above-mentioned parameters and to create demo tasks or simulated tasks which match the volume metric with the similar arrival patterns. Based on the resource availability the tasks are allocated during that duration. For example, if at 11:00 AM there are 3 tasks and 2 agents available with no task assigned, then 2 tasks are assigned to the available agents and the 3rd task ages as there is no one available to take up the task.

Figure 11:
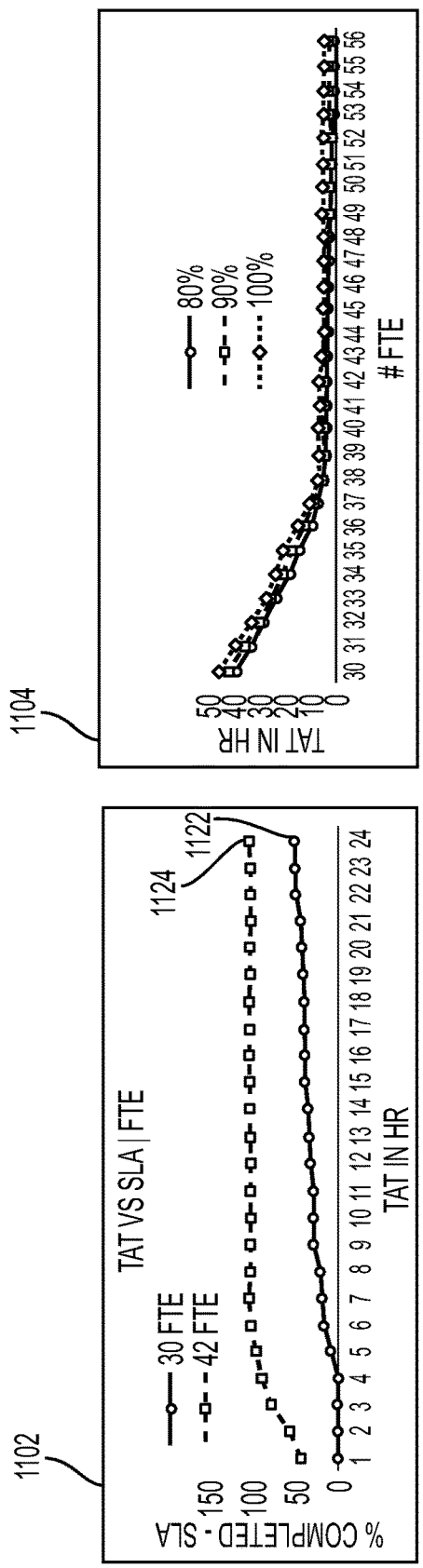
FIG. 11 shows different simulations that can be generated in accordance with the examples disclosed herein.
Figure 11:
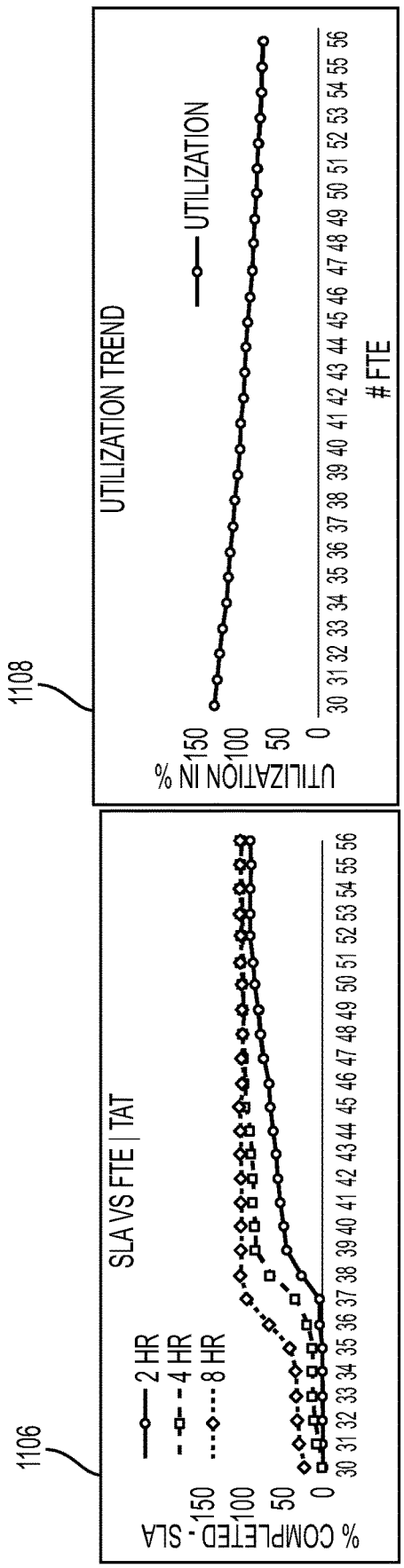

FIG. 11 shows different simulations that can be generated in accordance with the examples disclosed herein. The graph 1102 shows how TAT and SLA can be affected by variations in the resource count. The graph 1122 shows the percentage of tasks completed in 24 hours for 30 agents while the graph 1124 shows the percentage of tasks completed in 24 hours for 42 agents. As seen from the graphs, the addition of 12 more agents speeds up the task processing considerably. The graph 1104 conveys the time taken by teams with varying resource count to complete x % of the tasks. As seen from the graph 1104 increasing the FTEs or agents from 30 to 40 approximately reduces the TAT in hours considerably. But additional agents, e.g., increasing the number of agents from 40 to 50 shows no appreciable gain in the TAT. The graph 1106 shows the percentage of tasks completed by different agent teams for a given TAT. Again, the simulation shows that no appreciable increase in the percentage of completed tasks is observed beyond 53-55 agents. The graph 1108 shows a utilization report that conveys the trend of utilization for different agents for a given process.

Figure 12:
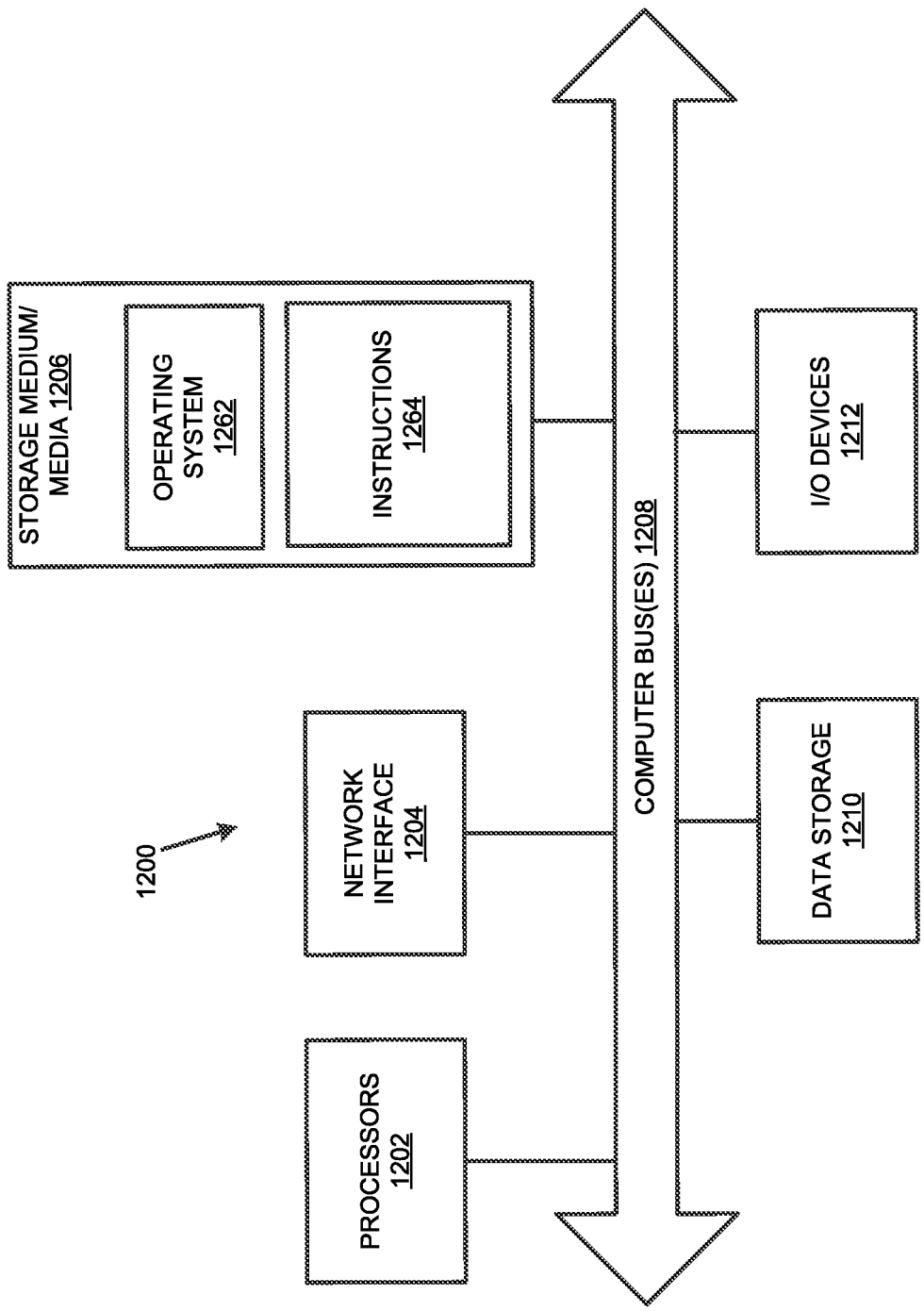
FIG. 12 illustrates a computer system that may be used to implement the payments processing system.

FIG. 12 illustrates a computer system 1200 that may be used to implement the resource data modeling, optimization, and simulation system 100. More particularly, computing machines such as desktops, laptops, smartphones, tablets, and wearables which may be used to generate or access the data from the resource data modeling, optimization, and simulation system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processor(s) 1202 to perform the methods and functions of the resource data modeling, optimization, and simulation system 100.

The resource data modeling, optimization, and simulation system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the resource data modeling, optimization, and simulation system 100. The operating system 1262 may be multi-user, multiprocessing, multitasking, multithreading, real-time, and the like. For example, during runtime, the operating system 1262 is running and the code for the resource data modeling, optimization and simulation system 100 is executed by the processor(s) 1202.

The computer system 1200 may include a data storage 1210, which may include non-volatile data storage. The data storage 1210 stores any data used by the resource data modeling, optimization, and simulation system 100. The data storage 1210 may be used to store the aggregated data, the forecasts, the simulations, and other data that is used or generated by the resource data modeling, optimization, and simulation system 100 during the course of operation.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A resource data modeling and simulation system, comprising:
at least one processor;
a non-transitory processor-readable medium storing machine-readable instructions that cause the processor to:
receive historical time series data regarding data processing tasks and resources that are employed for handling the data processing tasks;
receive input regarding one of a short-term forecast and a long-term forecast to be generated, the short-term forecast and the long-term forecast pertaining to a number of the data processing tasks expected to be received in a corresponding one of a shorter time period and a longer time period;
if the input specifies the short-term forecast, then:
obtain short-term aggregated data by aggregating the time series data for the shorter time period;
generate updated short-term aggregated data including short-term aggregated data and aggregated data obtained from a time interval that elapsed since the short-term aggregated data was generated;
if an accuracy of an output of a prior short-term forecasting model falls within a predetermined accuracy threshold,
obtain the short-term forecast by employing the prior short-term forecasting model for analyzing the updated short-term aggregated data;
if an accuracy of the output of the prior short-term forecasting model falls outside the predetermined threshold,
obtain the short-term forecast by:
splitting the short-term aggregated data into training data and testing data,
training a plurality of forecasting models on the training data;
testing the plurality of forecasting models on the testing data;
comparing accuracies of the plurality of forecasting models; and
selecting as a new short-term forecasting model, one of the plurality of forecasting models with highest accuracy;
employing the new short-term forecasting model for analyzing the updated short-term aggregated data;
and
if the input requires the long-term forecast, then:
obtain long-term aggregated data by aggregating the time series data for the longer time period;
generate updated long-term aggregated data including the long-term aggregated data and aggregated data obtained from a time interval since the long-term aggregated data was generated and the specified time;
select a long-term forecasting model from a plurality of long-term forecasting models based on an accuracy of an output of the selected long-term forecasting model falling within the predetermined threshold;

obtain the long-term forecast by employing the selected long-term forecasting model for analyzing the updated long-term aggregated data;

calculate a number of resources required to handle the data processing tasks expected to be received in the corresponding one of the shorter time period and the longer time period; and generate simulations for one or more parameters associated with the data processing tasks in response to simulation user input based at least on optimized values of one or more of the short-term forecast and the long-term forecast.

2. The resource data modeling and simulation system of claim 1, wherein the historical time series data includes univariate time series data of requests for the data processing tasks, average handling time (AHT) for each of the data processing tasks, shift duration of the resources, productive hours including a time period for which the resources handled the data processing tasks and shrinkage values associated with the shifts.

3. The resource data modeling and simulation system of claim 1, wherein the processor is to further:

preprocess the historical time series data for one or more of missing values and outliers; and obtain a hypertext markup language (HTML) file including the historical time series data.

4. The resource data modeling and simulation system of claim 1, wherein to obtain the short-term forecast by employing the prior short-term forecasting model, the processor is to further:

calculate a mean absolute percentage error (MAPE) for the prior short-term forecasting model; and employ the prior short-term forecasting model for generating the short-term forecast if the MAPE of the prior forecasting model is less than a predetermined percentage or if the MAPE of the prior short-term forecasting model is less than a predetermined point variation from a prior MAPE of the prior forecasting model.

5. The resource data modeling and simulation system of claim 1, wherein to select the new short-term forecasting model the processor is to further:

calculate a mean absolute percentage error (MAPE) for each of the plurality of forecasting models; and select one of the plurality of forecasting models with a minimum MAPE value as the new short-term forecasting model.

6. The resource data modeling and simulation system of claim 1, wherein to obtain the optimized values the processor is to further:

generate the short-term aggregated data by aggregating the historical time series data at a daily level;

obtain the short-term forecast at the daily level using the short-term aggregated data aggregated at the daily level; and calculate data proportions for hourly and half-hourly periods from the short-term forecast at the daily level.

7. The resource data modeling and simulation system of claim 6, wherein to obtain the optimized values of the forecasts the processor is to further:

split the short-term forecast at the daily level at one of the hourly and the half-hourly periods based on the data proportions; and compute a number of the resources based on a forecasted task volume obtained from splitting the short-term forecast at the daily level.

8. The resource data modeling and simulation system of claim 7, wherein to obtain the optimized value of the short-term forecast the processor is to further:

create a decision matrix using the number of resources computed based on the forecasted task volume in conjunction with shift timings of the resources, wherein the shift timings are obtained from a shift information source file;

calculate a number of resources required hourly for completion of the data processing tasks by using linear programming with shifts specified in the shift information source file; and further, optimize the number of resources required hourly based on a shrinkage factor.

9. The resource data modeling and simulation system of claim 1, wherein to obtain the optimized values of the forecasts for long-term the processor is to further:

generate the long-term aggregated data by aggregating the historical time series data for a plurality of weeks; and calculate the optimized value of the long-term forecast using a formula:

$$\text{the optimized value of the long-term forecast} = \frac{(\text{long-term forecast} * \text{Average handling time } (AHT))}{(\text{Seconds for a week} * \text{productive hours})}.$$

10. The resource data modeling and simulation system of claim 1, wherein to generate the simulations the processor is to further:

receive the simulation user input including variations to one or more of a number of the resources handling the data processing tasks and operational parameters associated with a procedure to execute the data processing tasks.

11. The resource data modeling and simulation system of claim 10, wherein to generate the simulations the processor is to further:

create tickets based on historical arrival pattern of the data processing tasks; and assign the tickets to available resources based on a resource availability table.

12. The resource data modeling and simulation system of claim 11, wherein to generate the simulations the processor is to further:

record the operational parameters including the AHTs and Turn Around Time (TAT) of each of the tickets for different levels of the resources, wherein the different levels of resources include different numbers of resources.

13. The resource data modeling and simulation system of claim 11, wherein to generate the simulations the processor is to further:

record percentage of the data processing tasks completed by the resources for different hours of a day.

14. The resource data modeling and simulation system of claim 1, wherein the plurality of long-term forecasting models include at least Auto Regressive Integrated Moving Average (ARIMA) model and Holt Winters Model.

15. A method of modeling and simulating resource data comprising:

receiving resource data including historical time series data regarding data processing tasks and resources for handling the data processing tasks;

generating updated short-term aggregated data including short-term aggregated data and newer data aggregated after the short-term aggregated data was generated;

determining if a prior forecasting model exists for a short-term forecast pertaining to a number of the resources required to complete the data processing tasks in a shorter time period;

obtaining the short-term forecast by employing the prior forecasting model for analyzing the updated short-term aggregated data if the prior forecasting model exists and if an accuracy of an output of the prior forecasting model for the shorter time period falls within a predetermined accuracy threshold;

obtaining the short-term forecast by employing a new forecasting model for analyzing the updated short-term aggregated data if the prior forecasting model does not exist or if an accuracy of the output of the prior forecasting model falls outside the predetermined accuracy threshold;

generating updated long-term aggregated data including the long-term aggregated data and aggregated data generated during a time interval after the long-term aggregated data was generated;

obtaining the long-term forecast pertaining to a number of the resources required to complete the data processing tasks in a longer time period, wherein the long-term forecast is obtained by:
training a plurality of forecasting models on the updated long-term aggregated data;
testing the plurality of forecasting models trained on the updated long-term aggregated data; and
selecting a long-term forecasting model from the plurality of forecasting models based on an accuracy of an output of the selected long-term forecasting model falling within a predetermined accuracy threshold;
analyzing the updated long-term aggregated data by the selected long-term forecasting model; and generating simulations for one or more parameters associated with the data processing tasks in response to simulation user input based at least on optimized values of one or more of the short-term forecast and the long-term forecast.

16. The method of claim 15, wherein for obtaining the short-term forecast by employing the new forecasting model further comprising:
training the plurality of forecasting models on the updated short-term aggregated data;
testing the plurality of forecasting models trained on the updated short-term aggregated data; and
selecting the short-term forecasting model based on an accuracy of an output of the selected short-term forecasting model falling within a predetermined threshold.

17. A non-transitory processor-readable storage medium comprising machine-readable instructions that cause a processor to:
receive input regarding one of a short-term forecast and a long-term forecast to be generated, the short-term forecast and the long-term forecast pertaining to a number of data processing tasks expected to be received in a corresponding one of a shorter time period and a longer time period;

if the input specifies the short-term forecast, then:
obtain short-term aggregated data by aggregating time series data pertaining to the data processing tasks for the shorter time period;
generate updated short-term aggregated data including short-term aggregated data and aggregated data obtained from a time interval since the short-term aggregated data was generated and a specified time;
if an accuracy of an output of a prior short-term forecasting model falls within a predetermined threshold,
obtain the short-term forecast by employing the prior short-term forecasting model for analyzing the updated short-term aggregated data;
if an accuracy of the output of the prior short-term forecasting model falls outside the predetermined threshold,
obtain the short-term forecast by:
splitting the short-term aggregated data into training data and testing data,
training a plurality of forecasting models on the training data;
testing the plurality of forecasting models on the testing data;
comparing accuracies of the plurality of forecasting models; and
selecting as a new short-term forecasting model, one of the plurality of forecasting models with highest accuracy;
employing a new short-term forecasting model for analyzing the updated short-term aggregated data;
and
if the input requires the long-term forecast, then:
obtain long-term aggregated data by aggregating the time series data for the longer time period;
generate updated long-term aggregated data including the long-term aggregated data and aggregated data obtained from a time interval since the long-term aggregated data was generated and the specified time;
select a long-term forecasting model from a plurality of long-term forecasting models based on an accuracy of an output of the selected long-term forecasting model falling within the predetermined threshold;
obtain the long-term forecast by employing the selected long-term forecasting model for analyzing the updated long-term aggregated data;
calculate a number of resources required to handle the data processing tasks expected to be received in the corresponding one of the shorter time period and the longer time period; and
generate simulations for one or more parameters associated with the data processing tasks in response to simulation user input based at least on optimized values of one or more of the short-term forecast and the long-term forecast.

18. The non-transitory processor-readable storage medium of claim 17, further comprising instructions that cause the processor to:
receive the simulation user input including proportions of number of the resources required to complete corresponding data processing tasks and Average Handling Times (AHTs) for the proportions.

* * * * *